United States Patent [19]
Kelly, Jr. et al.

[11] 3,714,544
[45] Jan. 30, 1973

[54] BI-POLARITY POTENTIAL TRANSFORMER FOR MEASURING D-C VOLTAGE

[75] Inventors: Fred W. Kelly, Jr., Media, Pa.; Victor Mishkovsky, Ashland, N.J.; William R. Singletary, Wallingford, Pa.

[73] Assignee: General Electric Company

[22] Filed: Jan. 6, 1972

[21] Appl. No.: 215,860

[52] U.S. Cl. ............... 323/6, 323/44 R, 324/117 R, 324/127
[51] Int. Cl. .......................................... G01r 19/00
[58] Field of Search ............... 323/6, 44 R, 56, 60; 324/117 R, 127

[56] References Cited

UNITED STATES PATENTS

| | | | |
|---|---|---|---|
| 2,712,635 | 7/1955 | Borg | 324/127 |
| 3,430,142 | 2/1969 | Covert | 324/117 R |
| 3,500,195 | 3/1970 | Specht | 324/117 R |

Primary Examiner—A. D. Pellinen
Attorney—J. Wesley Haubner et al.

[57] ABSTRACT

A bipolarity potential transformer for measuring the voltage between a d-c line and a reference point has unidirectionally conducting branches connected in inverse parallel relation between the d-c line and the reference point. Transductor-type d-c current transformers are respectively connected in the two branches for measuring current therethrough. The load circuits of the two transformers are connected together in such a manner that an output signal is obtained in which the component resulting from magnetizing current is at least practically cancelled. Balancing reactors having their secondary windings respectively connected in the load circuits of the current transformers and their primary windings respectively connected in the conductive branches inhibit the formation of certain notches in the wave form of the load circuit current which are attributable to magnetizing current.

8 Claims, 3 Drawing Figures

BI-POLARITY POTENTIAL TRANSFORMER FOR MEASURING D-C VOLTAGE

BACKGROUND

This invention relates to a potential transformer for measuring the voltage between a d-c line and a reference point and, more particularly, relates to a d-c potential transformer which is operable to provide an output signal representative of this voltage irrespective of the polarity of the voltage.

Our potential transformer comprises a pair of conductive branches, each of which is adapted to be connected between the d-c line and the reference point. Each branch contains unidirectional current-blocking means arranged so that the branches are connected in inverse parallel relationship between the d-c line and the reference point. Accordingly, when the d-c line has one polarity with respect to the reference point, direct current flows in one direction through one branch; and when the polarity reverses, direct current flows in the opposite direction through the other branch. The instantaneous current through each branch is measured, and this instantaneous current is directly proportional to the instantaneous voltage in question.

For measuring the instantaneous current through the two branches, we provide two transductor type d-c measuring current transformers, a different one of which is connected in each branch. These current transformers are preferably of the general type disclosed in detail by N.G. Hingorani in an article on pages 53–60 of the May, 1964, issue of *Direct Current*, a journal published quarterly by Direct Current, Ltd., London, England; note especially Figs. 8 and 9.

The Hingorani type current transformer comprises two measuring reactors, each comprising a saturable core and primary and secondary windings linked to said core. The primary windings are connected in series, and substantial saturation of the cores is associated with normal primary current. An alternating voltage is applied to said secondary windings in such a manner as to tend to change the flux in one direction during one half-cycle of the alternative voltage and in the opposite direction during the other half-cycle. The relative direction of flux change in the two cores is always opposite. The intervals of saturation of the core symmetrically displaced by half the period of the alternating voltage and are substantially shorter than half this period. Thus, either one or the other of the cores is always unsaturated. The secondary winding current associated with an unsaturated core counterbalances the transformed unidirectional primary winding current to within a degree of error associated with the magnetizing current for the core. The secondary windings are connected in circuit with a rectifier arrangement and a load circuit in such a manner that the maximum instantaneous value of secondary winding current associated with the unsaturated cores flows unidirectionally in the load circuit. The resulting undirectional current through the load circuit is approximately proportional to the primary current.

We have found that under certain conditions, the alternating voltage applied to the secondary windings can induce an appreciable circulating current in a primary circuit loop comprising the series combination of the two conductive branches. This circulating current is a pulsating current superimposed on the normal primary current, and its presence can introduce serious errors in the ability of the potential transformer to produce an output signal proportional to the voltage between the d-c line and the reference point.

An object of our invention is to limit this circulating current to a trivial value which does not appreciably interfere with the measuring accuracy of the potential transformer.

In the current transformer described in the aforesaid paper by Hingorani, the current through the load circuit of the transformer has a wave form characterized by notches periodically occurring each time the alternating voltage applied to the secondary windings passes through zero. These notches have a depth that is directly dependent upon the core magnetizing current, and their presence interferes with the ability of the transformer to produce an output signal that is continuously proportional to primary current. In a potential transformer application, where magnetizing current is appreciable relative to the small primary current, these notches tend to be quite deep, and the error introduced by these notches can seriously detract from the measuring accuracy.

Another object of our invention is to inhibit the formation of these notches in the wave form of the current passing through the load circuit of the transformer.

In the aforesaid Hingorani transformer, the load current of the transformer contains an error component proportional to the magnetizing current required to saturate the core of the measuring reactor.

Another object of our invention is to substantially eliminate this error component resulting from magnetizing current.

SUMMARY

In carrying out our invention in one form, we provide a bipolarity potential transformer comprising a pair of conductive branches, each containing unidirectional current-blocking means, for connection in inverse parallel relationship between a d-c line and a reference point. A pair of transductor type d-c current transformers of the kind referred to hereinabove are respectively connected in the two branches for measuring the instantaneous current through their associated branches. Each of these current transformers includes a load circuit through which unidirectional current flows having an instantaneous magnitude substantially proportional to $I_p + I_m$, where $I_p$ is the instantaneous d-c through the primary windings of the current transformer and $I_m$ is the magnetizing current, referred to the primary winding, required for saturation of each core of the two measuring reactors in the current transformer. Means responsive to the instantaneous currents through the load circuits of the two current transformers is provided for developing an output signal substantially proportional to the difference in said instantaneous load circuit currents, thus providing for at least partial cancellation of the magnetizing current component in said output signal.

Within the potential transformer there is a loop circuit in which said conductive branches are connected in series. For limiting the circulating current induced in this loop circuit by alternating voltage supplied to the current transformers, a pair of high ohmic resistances of substantially equal values are respectively connected in said two branches.

For inhibiting formation of the above-described notches in the wave form of the load circuit current, we provide balancing reactor means comprising a pair of secondary windings respectively connected in the load circuits of the two current transformers, primary winding means arranged to be energized by current through either of said branches, and core means to which said primary winding means and said secondary windings are linked.

BRIEF DESCRIPTION OF DRAWINGS

For a better understanding of the invention, reference may be had to the following description taken in connection with the accompanying drawing, wherein.

General Description of Potential Transformer 14 and its Connection to the Line 10

Figure 1:
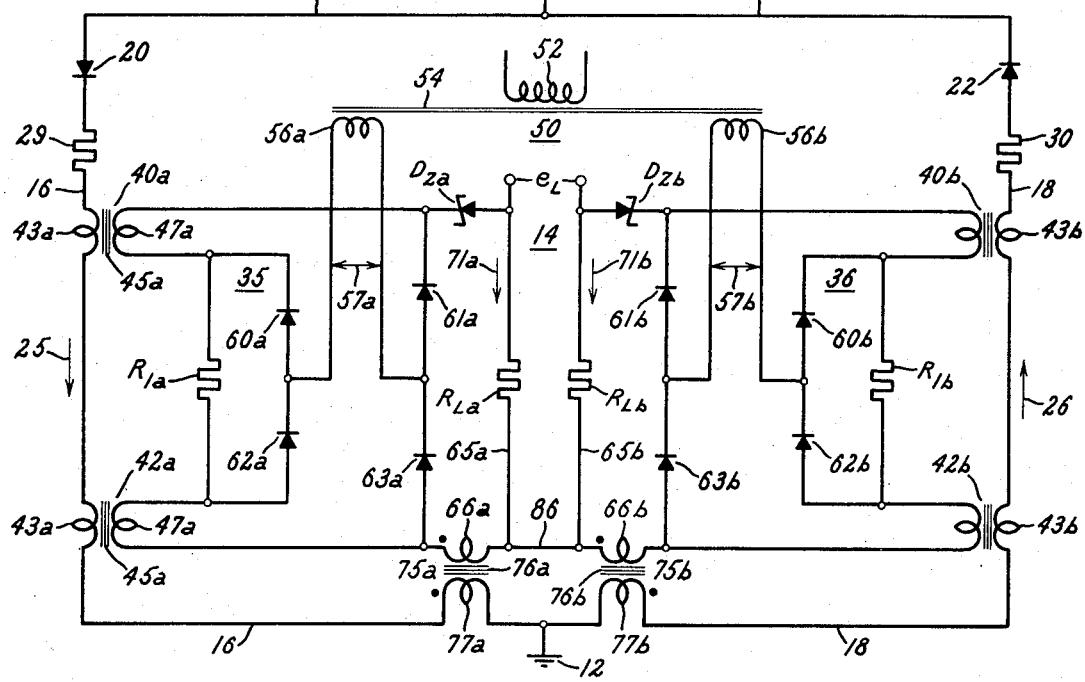
FIG. 1 is a wiring diagram of a bi-polarity potential transformer embodying one form of the invention.

Referring now to FIG. 1, there is shown a high voltage d-c line 10 which, for various periods of time, may be at either a positive or a negative voltage with respect to the reference point 12. For continuously measuring the instantaneous voltage between line 10 and reference point 12 irrespective of its polarity, we provide a d-c potential transformer 14.

This potential transformer comprises a pair of conductive branches 16 and 18, each of which contains unidirectional current-blocking means, shown as diodes 20 and 22. These branches are connected in inverse parallel relationship between line 10 and reference point 12 so that when line 10 is positive with respect to point 12, current flows in the direction of arrow 25 through branch 16; and when line 10 is negative with respect to point 12, current flows in the direction of arrow 26 through branch 18.

The two conductive branches 16 and 18 are connected in series with a high ohmic resistor 28 which serves to severely limit the current therethrough, thereby preventing objectionable power loss from the system as a result of the presence of the potential transformer. Respectively connected within branches 16 and 18 are two additional resistors 29 and 30, substantially identical to each other and of relatively high ohmic value, the purpose of which will soon appear more clearly.

Potential transformer 14 operates by measuring the instantaneous value of current through the branch 16 or 18 that is conducting at any given instant. This current is normally proportional to the voltage between line 10 and reference point 12.

Current Transformers 35 and 36

For measuring the current through branch 16, we provide a transductor type d-c current transformer 35 in series with branch 16; and for measuring the current through branch 18, we provide a substantially identical d-c current transformer 36 in series with branch 18. These two d-c current transformers 35 and 36 are of the general type disclosed in detail in the aforesaid Hingorani article and also in Hingorani's British Pat. No. 1,099,804. Since these current transformers are substantially identical, corresponding parts thereof have been assigned corresponding reference characters differing only in the postscript "a" or "b". One of the current transformers 35 will be described in some detail, but if more details are desired, reference may be had to the aforesaid Hingorani article.

The d-c current transformer 35 comprises two measuring reactors 40a and 42a, each comprising a primary winding 43a connected in series with branch 16 a saturable core 45a to which the primary winding is linked, and a secondary winding 47a also linked to the core 45a. The cores are of a material that has a sharp saturation point and very low magnetizing ampere-turns, e.g., the nickel-iron-molybdenum alloy sold under the trademark Supermalloy.

For controlling the flux level in the cores 45a, an alternating voltage is applied to the secondary windings 47a. This alternating voltage is derived from a power supply transformer 50 comprising a primary winding 52, a core 54, and two secondary windings 56a and 56b linked to core 54. The alternating voltage 57a appearing across secondary winding 56a acts as a power supply for current transformer 35 and that across secondary winding 56a acts as a power supply for current transformer 36.

The alternating voltage 57a is applied to the input terminals of a bridge type rectifier comprising four diodes 60a, 61a, 62a, and 63a. The secondary winding 47a of reactor 40a is connected between the cathodes of diodes 60a and 61a, and the secondary winding 47a of the other reactor 42a is connected between the anodes of diodes 62a and 63a. Connected between the anode of diode 62a and the cathode of diode 60a is a current limiting resistor $R_{1a}$. Connected between the anode of diode 63a and the cathode of diode 61a is a load circuit comprising a load resistor $R_{La}$. Although not essential, a Zener diode $D_{Za}$ is preferably connected in series with the load resistor $R_{La}$ in the load circuit. The secondary winding 66A of a balancing reactor 75A is also connected in the load circuit for reasons to be explained later.

Substantial saturation of the cores 45a is associated with normal primary current through primary windings 43a. The alternating voltage 57a is applied to secondary windings 47a in such a way that it tends to change the flux in one direction during one half-cycle of the alternating voltage and in the opposite direction during the other half-cycle. The relative direction of the flux change in the two cores 45a is always opposite. The intervals of saturation of the cores are symmetrically displaced by half the period of the alternating voltage 57a and are substantially shorter than half this period. Accordingly, either one or the other of the cores is always unsaturated.

Figure 2:
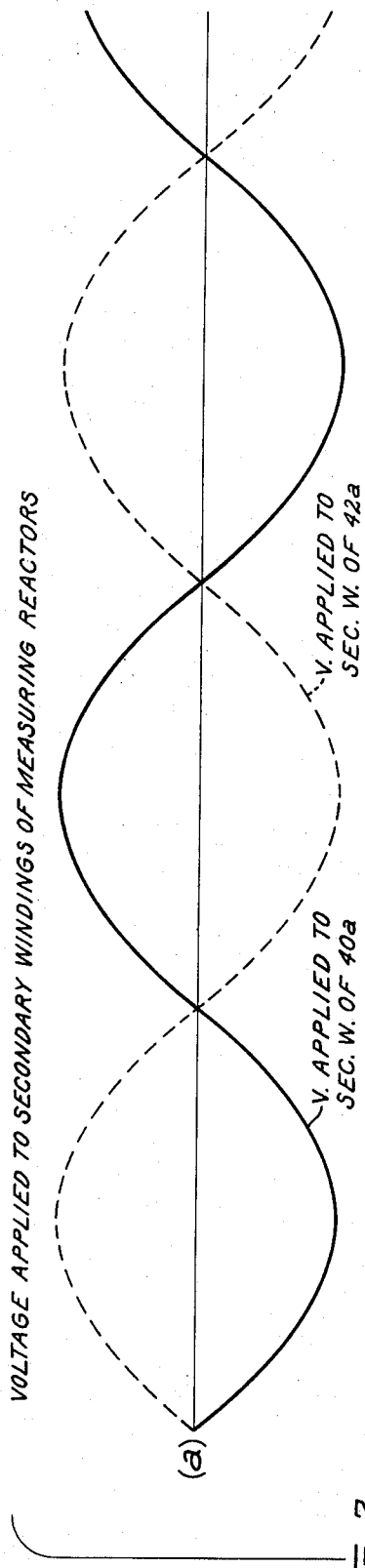
FIG. 2 is a graphic representation of certain voltage and current relationships present in the potential transformer of FIG. 1.
Figure 2:
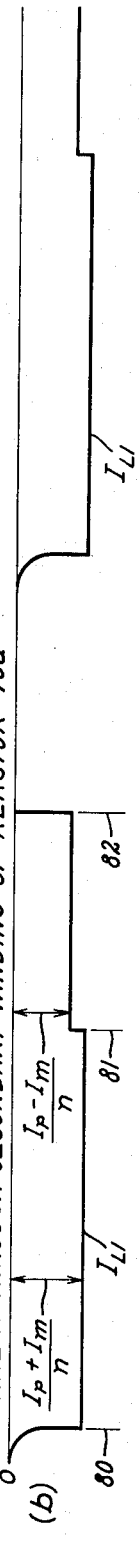
Figure 2:
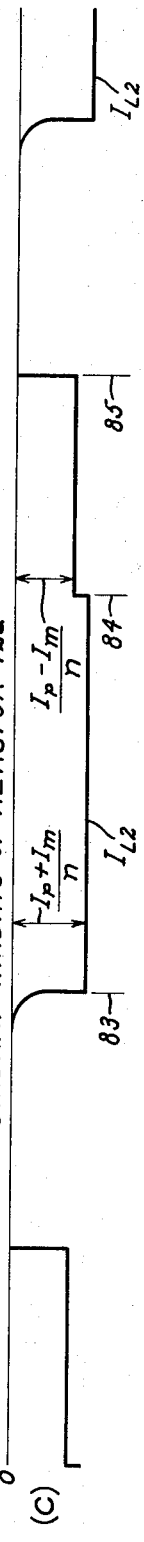
Figure 2:
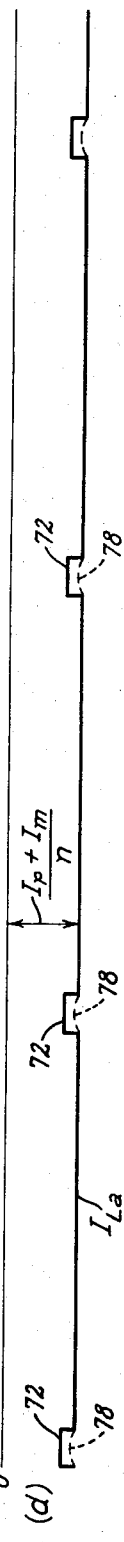

Neglecting for the time being the effect of the balancing reactor 75a, current $I_{L1}$ flowing through the secondary winding 47a of the first measuring reactor 40a in a direction to oppose magnetization of its core by primary current has a waveform of the shape shown in FIG. 2b. In FIG. 2b, the current $I_{L1}$ between the instants 80 and 81 is equal to approximately $1/n(I_p+I_m)$ and between instants 81 and 82 is equal to $/n(I_p-I_m)$, where $I_p$ is the current through primary winding 43a; $I_m$ is the magnetizing current, referred to the primary winding, for measuring reactor 40a; and n is the turns ratio of the measuring reactor 40a (i.e., $N_s/N_p$, where $N_s$ is the number of turns in the secondary winding 47a and $N_p$ is the number of turns in the primary winding 43a).

Current $I_{L2}$ through the secondary winding 47a of the second measuring reactor 42a in a direction to oppose magnetization of its core by primary current has a waveform of the shape shown in FIG. 2c. In FIG. 2c, the current $I_{L2}$ between the instants 83 and 84 is equal to $1/n(I_pI_m)$ and between instants 84 and 85 is equal to $1/n(I_pI_m)$, where $I_p$, $I_m$ and n are the same quantities as described in connection with FIG. 2b except as applied to the second measuring reactor 42a.

The current flowing through the load circuit 65a is equal in instantaneous magnitude to the highest instantaneous value of these currents and has a waveform $I_{La}$ shown in FIG. 2d. This current through 65a is a unidirectional current flowing in the direction of arrow 71a.

It will be seen that the waveform $I_{La}$ of FIG. 2d contains notches 72 periodically-occurring each time the voltage applied to secondary windings 47a passes through zero. Between these notches the current $I_{La}$ is equal to $1/n(I_p+I_m)$. These notches have a depth that is equal to approximately $2I_m/n$. These notches 72 represent an error in the measuring accuracy of the current transformer since they are not present in the waveform of the actual primary current.

INHIBITING THE FORMATION OF NOTCHES 72

For inhibiting the formation of these notches 72, we provide a pair of balancing reactors 75a and 75b of substantially identical construction. Each balancing reactor comprises a core 76a or 76b, a secondary winding 66a or 66b and a primary winding 77a or 77b. The secondary winding 66a of the balancing reactor 75a is connected in load circuit 65a in series with load resistor $R_{La}$, and the primary winding 77a is connected in branch 16 in series with the primaries of measuring reactors 40a and 42a. Correspondingly, the secondary winding of the other balancing reactor 75b is connected in load circuit 65b and its primary winding is connected in branch 18.

Assume now that branch 16 is conducting and a load current $I_{La}$ is flowing in its load circuit 65a. When the load current through 65a starts to change at the beginning of a notch 72, a counter-voltage opposing this change in current is developed across the secondary winding 66a of the balancing reactor. The effect of this counter-voltage is to inhibit formation of the notch 72, thus maintaining a waveform configuration in the notch region approximately corresponding to that shown by the dotted line 78.

The following will explain how the balancing reactor 75a develops the counter-voltage to inhibit notch formation. There will be no magnetizing current associated with balancing reactor 75a so long as $I_{La}N_S + I_pN_{AX}=0$, where $I_{La}$ is the current through load circuit 65a, $I_p$ is the primary current through branch 16, $N_s$ is the number of secondary turns in the balancing reactor 75a, and $N_p$ is the number of primary turns in the balancing reactor 75a. However, if this condition is upset as a result of a change in secondary (or load) current $I_{La}$ independent of primary current, as happens during the start of a notch 72, then a magnetizing current will tend to develop which opposes the change in secondary current and limits the change in secondary current to a relatively small value.

In order for the balancing reactor to perform its notch-inhibiting function as above described, its magnetizing current (referred to its secondary winding) should not substantially exceed the magnetizing current for the measuring reactor (referred to its secondary winding) and preferably should be less than this magnetizing current for the measuring reactor.

The preferred lower magnetizing current for the balancing reactor can be had by providing the balancing reactor with a larger number of secondary turns than each measuring reactor (assuming that the balancing and measuring reactors have identical cores), or it can be provided by using for the core of the balancing reactor a magnetic material having a narrow dynamic loop width on the B-H curve than the core material of each measuring reactor. In either case, however, the turns ratio of the balancing reactor should be substantially the same as that of the measuring reactor.

The relative polarities of the windings of the balancing reactors are as shown by the dots applied to certain terminals of the windings.

While it is recognized that a simple inductor (instead of our balancing reactor) connected in load circuit 65a could inhibit notch formation, such an arrangement would be deficient in failing to discriminate between those changes in secondary current resulting from changes in primary current and those changes in secondary current which occur independently of changes in primary current. Our balancing reactor arrangement, on the other hand, is capable of discriminating between these two different types of changes and acts to inhibit a secondary current change only if it occurs independently of a corresponding change in the primary current, as is the case with notches 72.

It is to be understood that the other balancing reactor 75b operates to inhibit notch formation in substantially this same manner when branch 18 is conducting and a current corresponding to that of FIG. 2d is flowing through load circuit 65b in the direction of arrow 71b.

The $I_m$ Component of the Load Current

In the above description, it has been assumed that a finite primary current was flowing in branch 16. If no primary current is flowing in branch 16, the current through the load circuit 65a, is equal to $I_m/n$. Since the magnetizing current $I_m$ remains substantially the same irrespective of the primary current, this magnetizing current component of the load current, i.e., $I_m/n$, remains substantially constant irrespective of the primary current.

The other current transformer 36 operates in substantially the same manner as described hereinabove with respect to current transformer 35. In this respect, current transformer 36 develops a current $I_{LB}$ in its load circuit 65b equal to $1/n(I_p+I_m)$, where $I_p$ is the primary current through branch 18, $I_m$ is the magnetizing current for each measuring reactor referred to its primary winding, and n is the turns ratio of the measuring reactor. Since all of the measuring reactors are substantially identical, $I_m$ is the same for all of the reactors, and $n$ is the same for all the reactors.

It will be apparent from the above that while current is flowing through branch 16 and the current transformer 35 is developing a load current $(I_p+I_m)/n$, the current transformer 36 is developing a load current $I_m/n$. Conversely, when current is flowing through branch 18, the current transformer 36 is developing a load current $I_p+(I_m)/n$, the current transformer 35 is developing a load current $I_m/n$.

Compensating for the Error Represented by $I_m$

The component $I_m$ in the load current represents an error in the measuring accuracy of each current transformer since only $I_p$ flows in the primary winding, and this is the quantity which the current transformer should be measuring.

We compensate for this error represented by $I_m$ in the following manner. First, by making all the measuring reactors 40a, 42a, 40b, 42b substantially identical, we make the quantity $I_m n$ for current transformer 36 substantially equal to $I_m/n$ for current transformer 35. Secondly, we, in effect, subtract this quantity $I_m n$ (derived from current transformer 36) from the quantity $(I_p+I_m)/n$ (derived from current transformer 35) by converting both these quantities to voltages and subtracting the two voltages. This conversion and subtraction is effected by developing across the load resistor $R_{La}$ a voltage $e_a$ proportional to $(I_p+I_m)/n$ and by developing across identical load resistor $R_{LB}$ a voltage $e_b$ proportional by the same multiplier $I_m/n$. The negative (or lower) terminals of the two resistors $R_{La}$ and $R_{Lb}$ are connected together at 86 and are therefore at substantially the same potential. Thus, the voltage $e_L$ appearing between the positive (or upper) terminals of the two resistors is equal to the difference between the two voltages $e_a$ and $e_b$, or $kI_p$, where k is a constant equal to the resistance of $R_{La}$. Accordingly, $e_L$ is substantially proportional to $I_p$.

Of course, if branch 18 is carrying current and branch 16 is not, a corresponding compensating effect is produced by subtracting the voltage developed across $R_{La}$ from that developed across $R_{Lb}$ to provide an output voltage $e_L$ proportional to $I_p$ in the branch 18.

Circulating Current

Neglecting for the time being the effect of resistors 29 and 30, we have found that under certain conditions the alternating voltages 57a and 57b applied to the secondary windings 47a and 47b can induce an appreciable circulating current in a loop of the primary circuit constituted by the two branches 16 and 18 connected in series. The circulating current will be a pulsating current flowing in the direction permitted by diodes 20 and 22 and superimposed upon the normal primary current. The presence of this pulsating current can introduce serious errors in the ability of the potential transformers to produce an output signal proportional to the voltage between line 10 and reference point 12.

For limiting the circulating current to a trivial value, we have inserted the resistors 29 and 30 in the respective branches 16 and 18. Each of these resistors is a high ohmic resistor having a resistance substantially greater (preferably an order or two of magnitude greater) than the transformed-to-primary resistance of its associated load resistor $R_{La}$ or $R_{Lb}$. As is well known, the transformed-to-primary value of a resistance $R_L$ in the secondary circuit is $R_L/n^2$, where $n$ is the turns ratio of the measuring reactor.

It is to be noted that when the line 10 is at a relatively high voltage with respect to point 12, the opposing diode 22 is strongly biased in a blocking direction by the relatively high voltage drop which appears across the conducting branch 16. This blocking bias prevents any circulating currents from flowing under these high voltage conditions. It is only when the voltage falls to relatively low values that the blocking bias falls to such a low level that circulating current can flow around the loop 16, 18. Under these conditions, the high ohmic resistors 29 and 30 serve their intended function of limiting this circulating current to a trivial value.

SPECIFIC EXAMPLE

Figure 3:
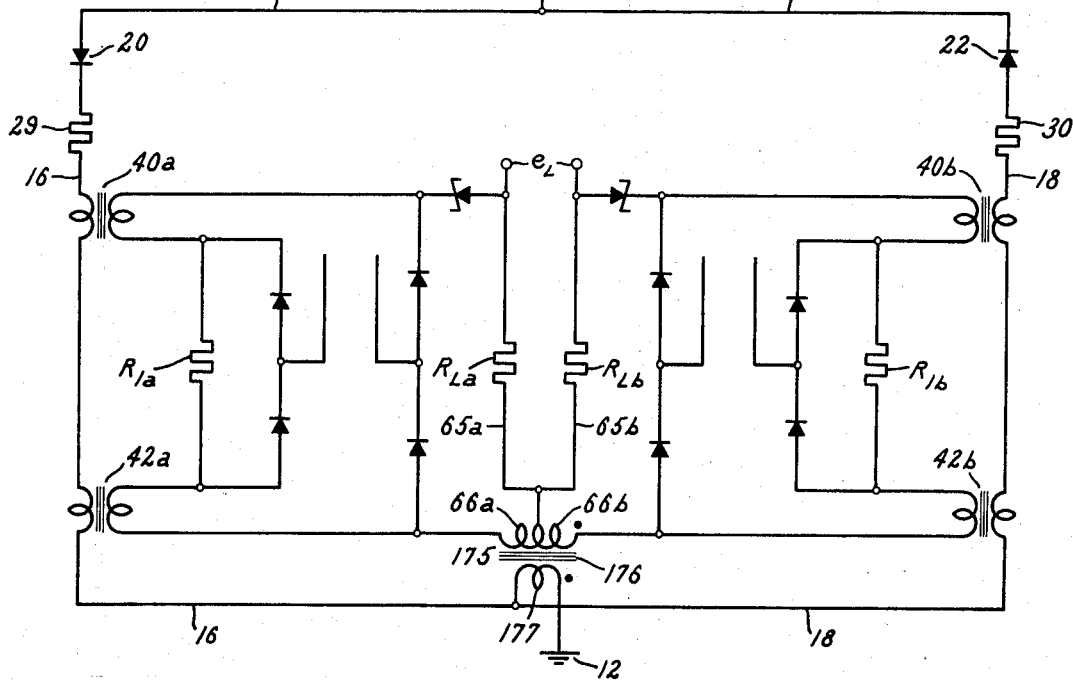
FIG. 3 is a wiring diagram of a modified bi-polarity potential transformer.

By way of example and not limitation, the illustrated potential transformer when applied to an 80 KV d-c line can include components with the following specific values:

Resistor 28: 7,900,000 ohms
Resistor 29: 100,000 ohms
Each of the Resistors $R_{La}$ and $R_{Lb}$: 1,023 ohms
Each of the resistors $R_{1a}$ and $R_{1b}$: 1,000 ohms
Turns in primary of each measuring reactor: 1,540
Turns in secondary of each measuring reactor: 1,540
Voltages 57a and 57b: 27 volts Modification of FIG. 3

FIG. 3 illustrates another form of the invention corresponding to that of FIG. 1 except containing modified means for inhibiting notch formation. This modified means comprises a balancing reactor 175 having a single core 176, one primary winding 177, and two secondary windings 66a and 66b. The primary winding is connected between the junction of the two branches 16 and 18 and the reference point 12. The two secondary windings are respectively connected in the load circuits 65a and 65b. The primary winding 177 is traversed by the current flowing through either branch 16 or 18.

This arrangement operates in substantially the same manner as that of FIG. 1 in that there is no countervoltage developed across the secondary winding 66a or 66b of the current transformer associated with the conducting branch 16 or 18 so long as $I_L N_s + I_p N_p = 0$, as explained hereinabove. Only when the secondary, or load, current changes independently of a change in the primary current, as happens at the start of a notch 72, is a countervoltage developed across the secondary winding for limiting the change in secondary current.

While we have shown and described particular embodiments of our invention, it will be obvious to those skilled in the art that various changes and modifications may be made without departing from our invention in its broader aspects; and we, therefore, intend herein to cover all such changes and modifications as fall within the true spirit and scope of our invention.

What we claim as new and desire to secure by Letters Patent of the United States is:

1. A bipolarity potential transformer for measuring the voltage between a d-c line and a reference point, comprising:
   a. a pair of conductive branches each containing unidirectional current-blocking means for connection between said line and said reference point in inverse parallel relationship,
   b. a pair of current transformers respectively connected in said two branches for measuring the instantaneous current through their associated branches,
   c. each current transformer comprising:
      i. first and second measuring reactors each comprising: a saturable core, a primary winding linked to said core for series connection in the branch associated with said current transformer, and a secondary winding linked to said core,
      ii. means comprising a load circuit for supplying to said secondary windings an alternating voltage that forces secondary current to pass through said secondary windings in a direction to oppose core magnetization by primary winding d-c during periods for the respective secondary windings that are out-of-phase with respect to each other,
      iii. said voltage supplying means comprising means for forcing unidirectionally through said load circuit secondary current equal in instantaneous value to the larger of the instantaneous values of current that is passing through each secondary winding in a direction to oppose core magnetization by primary winding d-c,
      iv. the instantaneous magnitude of the current through said load circuit being substantially proportional to $I_p+I_m$, where $I_p$ is the instantaneous d-c through said primary windings and $I_m$ is the magnetizing current, referred to the primary winding, required for saturation of each of said cores,
   d. means responsive to the instantaneous currents through said load circuits of said two current transformers for developing an output signal substantially proportional to the difference in said instantaneous load circuit currents, thus providing for at least partial cancellation of the magnetizing current components in said output signal,
   e. a loop circuit within said potential transformer in which said conductive branches are connected in series,
   f. and circulating-current limiting means operable when the voltage being measured is relatively low for limiting to a trivial value the magnitude of any circulating current induced in said loop circuit by said alternating voltage supplied to said secondary windings, said circulating current limiting means comprising a pair of high ohmic resistances of substantially equal values respectively connected in said two branches.

2. The potential transformer of claim 1 in which:
   a. the load circuit of each of said current transformers has an effective resistance, transformed to the primary circuit, of a predetermined value,
   b. the resistance connected in each branch of said primary circuit is at least an order of magnitude greater than said predetermined value of transformed-to-primary load circuit resistance.

3. The potential transformer of claim 1 in which:
   a. each of said current transformers has a tendency to produce a current through its load circuit that has a waveform characterized by notches therein occurring periodically when the alternating voltage applied to said secondary windings passes through zero,
   b. and means is provided for inhibiting the formation of said notches comprising: a balancing reactor having a primary winding that carries primary current between said line and said reference point when one of said branches is conducting said primary current, a core to which said primary winding is linked, and a secondary winding linked to said core and connected in the load circuit of the current transformer associated with said branch conducting said primary current.

4. The potential transformer of claim 1 in which:
   a. each of said current transformers has a tendency to produce a current through its load circuit that has a waveform characterized by periodically-occurring notches therein,
   b. and means is provided for inhibiting the formation of said notches comprising balancing reactor means for generating a voltage in each of said load circuits which opposes the change of current associated with said notches, said balancing reactor means being ineffective to oppose changes to the load circuit current which result from changes in the load circuit current which results from changes in the current through the primary windings of said measuring reactors.

5. The potential transformer of claim 1 in which:
   a. each of said current transformers has a tendency to produce a current through its load circuit that has a waveform characterized by notches therein occurring periodically when the alternating voltage applied to said secondary windings passes through zero,
   b. and means is provided for inhibiting the formation of notches in the load current through the load circuit of either of said current transformers comprising: balancing reactor means having a pair of secondary windings respectively connected in the load circuits of said current transformers, primary winding means arranged to be energized by current through either of said branches, and core means to which said primary winding means is linked and said secondary windings are linked.

6. The potential transformer of claim 5 in which: said primary winding means comprises a primary winding located in a circuit position where it is traversed by current through either of said branches, said core means comprises a single core linked to said primary winding and to said two secondary windings.

7. The potential transformer of claim 5 in which: said primary winding means of said balancing reactor means comprises two separate primary windings, one of which is traversed by current through one branch and the other of which is traversed by current through said other branch, said core means comprises two separate cores, one of which is linked to one of said primary windings and one of said secondary windings of said balancing reactor means, and the other of which is linked to the other of said primary windings and the other of said secondary windings of said balancing reactor means.

8. The potential transformer of claim 5 in which said balancing reactor means has a magnetizing current referred to its secondary winding in the load circuit of the conducting-branch current transformer that is substantially equal to or less than the magnetizing current for each of the measuring reactors of the conducting-branch current transformer referred to the secondary winding of the measuring reactor.

* * * * *